United States Patent [19]
Griffin

[11] Patent Number: 4,745,516
[45] Date of Patent: May 17, 1988

[54] SAFETY FLOOR AND SWEEP WITH LINE POWER

[75] Inventor: James W. Griffin, Lake Mills, Wis.

[73] Assignee: Spacesaver Corporation, Fort Atkinson, Wis.

[21] Appl. No.: 822,846

[22] Filed: Jan. 27, 1986

[51] Int. Cl.$^4$ .................... H01H 9/00; H01H 47/00; A47B 53/00

[52] U.S. Cl. .................... 361/189; 312/201; 361/194

[58] Field of Search .............. 312/198, 199, 200, 201; 361/189, 194, 195; 340/527, 644

[56] References Cited

U.S. PATENT DOCUMENTS

| | | | |
|---|---|---|---|
| 3,640,595 | 2/1972 | Staller et al. | 312/198 |
| 4,392,176 | 7/1983 | Kneip et al. | 361/189 |
| 4,616,888 | 10/1986 | Peterman | 312/201 |

Primary Examiner—L. T. Hix
Assistant Examiner—David Porterfield
Attorney, Agent, or Firm—Fuller, Puerner & Hohenfeldt

[57] ABSTRACT

A mobile storage system includes movable carriages that are stoppable by solenoid operated mechanical safety brakes. The solenoids are controlled by an electrical circuit that includes a safety floor and/or a safety sweep. Actuating the respective safety switches activates the circuit to energize the solenoids for operating the brakes. The safety floor portion of the circuit is designed to energize the brake as long as a safety floor switch is actuated. The safety floor circuit portion contains a timing device that holds the solenoid in the energized condition for at least 3 seconds after deactuation of the actuated safety switch, so that a person walking across the floor does not cause the solenoids to chatter. The safety sweep circuit contains first timing means for deenergizing the solenoid approximately 3 seconds after safety sweep switch actuation. If the actuated switch remains open after approximately 5 minutes, or if a safety sweep switch fails, an audio alarm sounds. Both the safety floor and safety sweep portions of the circuit include indicator circuits having light emitting diodes. The light emitting diodes are placed in appropriate control boxes within the mobile storage system to facilitate maintenance.

18 Claims, 2 Drawing Sheets

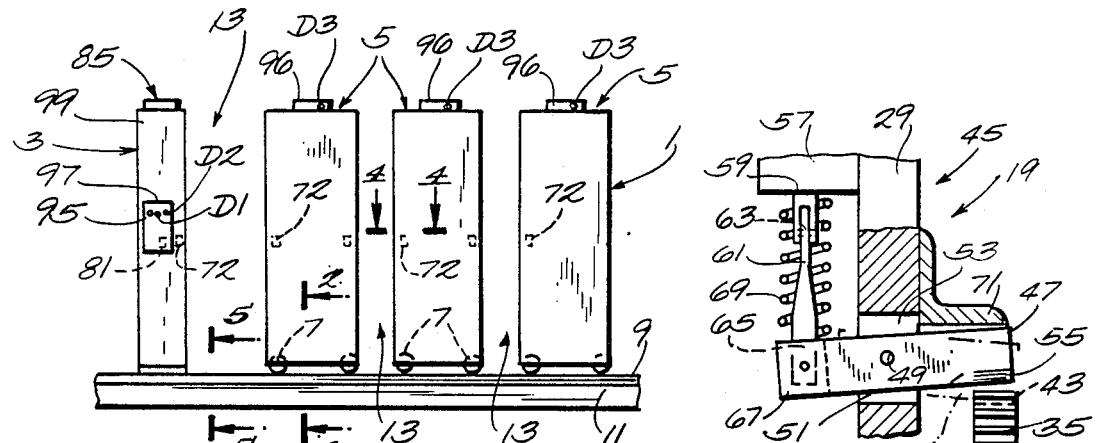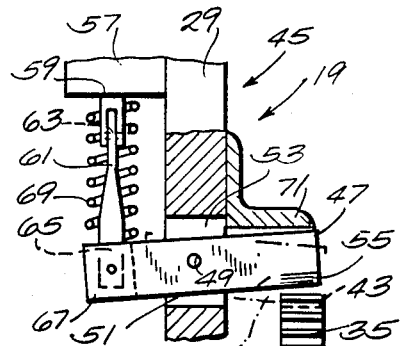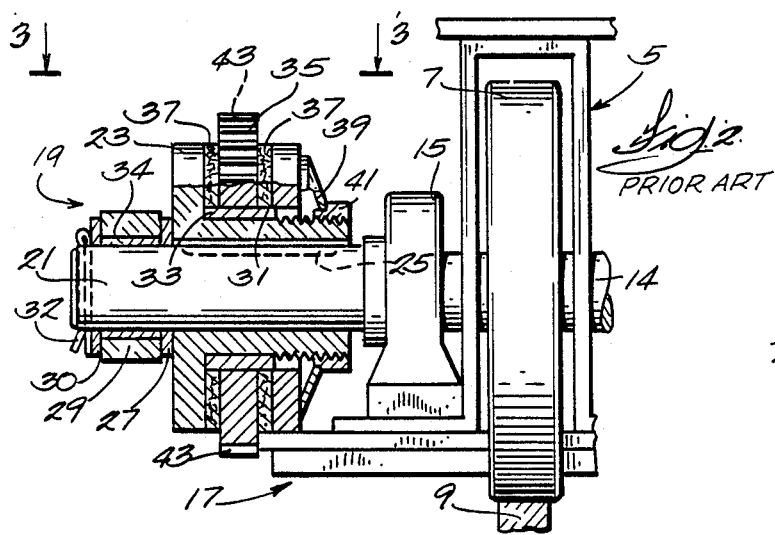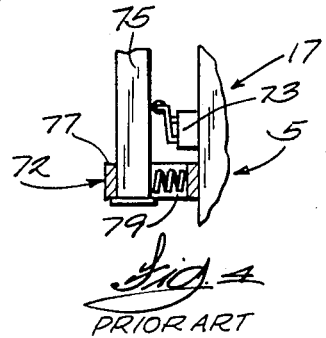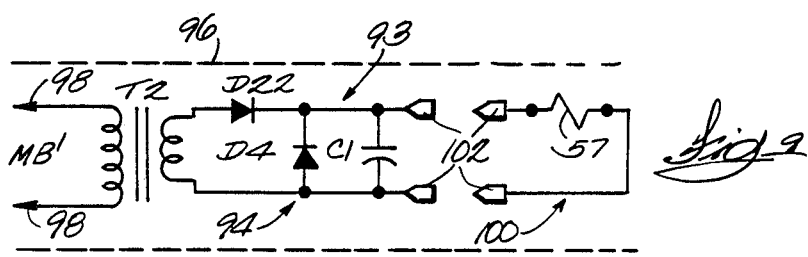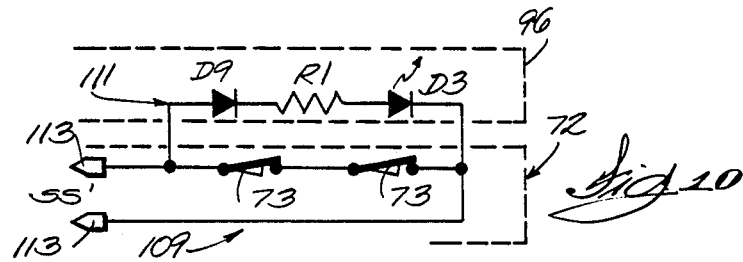

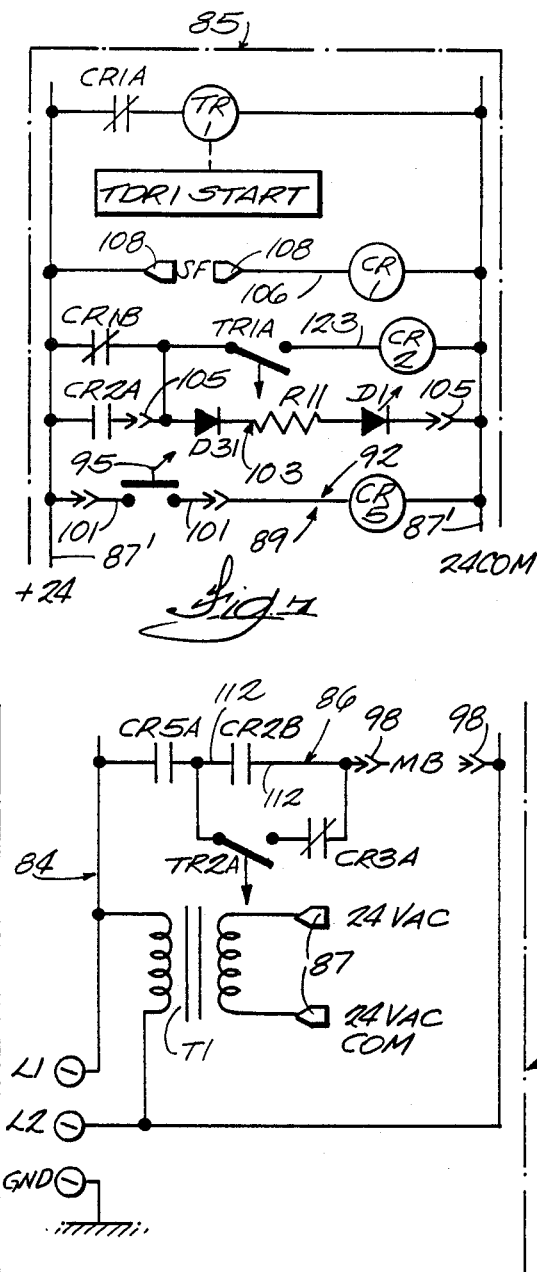
Fig. 7
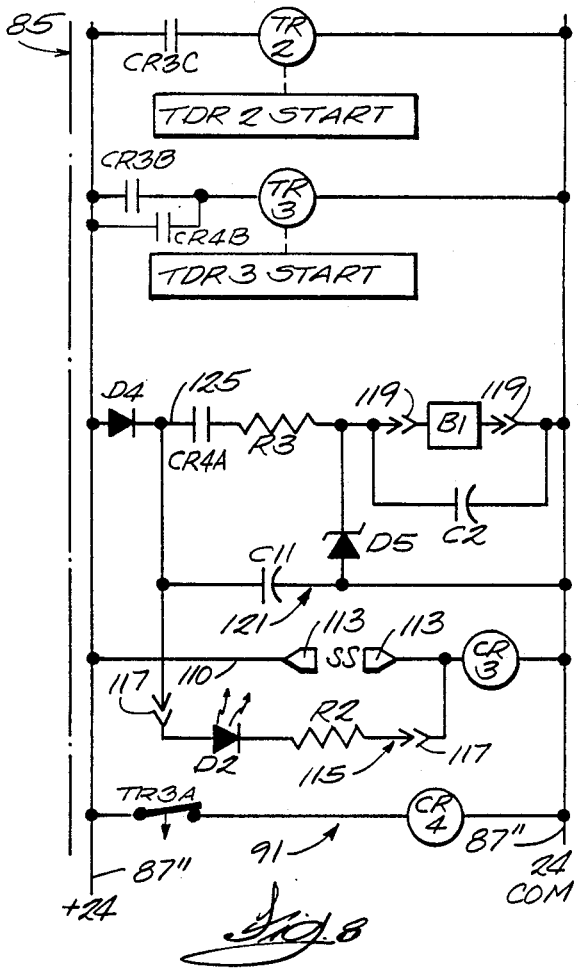
Fig. 8
Fig. 6
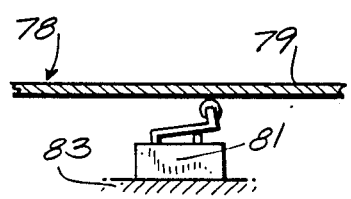
Fig. 5
PRIOR ART
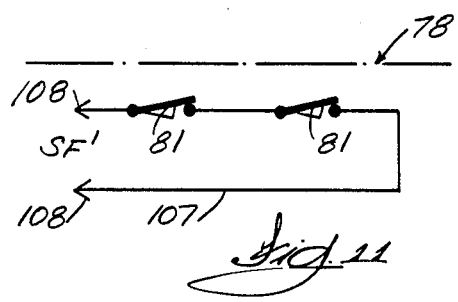
Fig. 11

SAFETY FLOOR AND SWEEP WITH LINE POWER

BACKGROUND OF THE INVENTION

1. Field of the Invention

This invention pertains to safety apparatus, and more particularly to safety apparatus for stopping a moving carriage of a mobile storage system upon command.

2. Description of the Prior Art

Mobile storage systems for storing books and similar items are in widespread use in libraries and offices. Mobile storage systems are popular because they conserve expensive floor space. Mobile storage systems with either manually or electrically powered movable carriages are commercially available.

An important part of a mobile storage system is the portion dealing with safely stopping a moving carriage in emergency situations. Such situations typically arise when a person is in an aisle adjacent a carriage and his presence is unknown to another person. The first person must be able to stop carriage movement that is started by the second person. One type of safety stop device is disclosed in U.S. Pat. No. 4,616,888. The disclosure of the U.S. Pat. No. 4,616,888 includes a mechanical brake in conjunction with a manually actuated safety sweep. Actuating the safety sweep activates a battery powered circuit to energize the brake and quickly and safely halt a moving carriage. Although quite satisfactory in operation, there are instances when it is desirable to employ 120 volt AC power for the safety circuit rather than battery power. For additional safety to persons using a mobile storage system, it is frequently desirable to place safety switches for energizing the carriage brake at locations other than the safety sweep. It is desirable for maintenance purposes that the safety circuit provide an indication of the location of the safety switch that was actuated to energize the safety brake.

SUMMARY OF THE INVENTION

In accordance with the present invention, improved safety means is provided that permits stopping a moving carriage of a mobile storage system from a greater number of locations than was previously possible. This is accomplished by apparatus that includes an electrical circuit operating at line voltage in combination with safety switches located on the carriages and also within a safety floor proximate the mobile storage system.

The safety floor may be constructed along generally known designs. For example, U.S. Pat. No. 3,640,595 discloses one type of floating floor. The safety floor comprises a plurality of force sensing switches placed under the floating floor that are electrically connected to the novel circuitry of the present invention. The circuitry includes a master control, which may be located on a stationary unit of the mobile storage system, and a slave control mounted on each movable carriage. The circuitry further includes components that are preferably mounted on a front panel of the stationary unit. The circuit is powered by 120 volt AC line power, which is preferably stepped down to 24 volts AC for operating the various circuit components.

Actuation of a safety floor switch activates the circuit so as to energize the mechanical brakes included on each carriage to stop all the carriages. The brakes remain energized until the safety floor switch is deactuated to the closed condition. In the preferred embodiment, the circuitry is designed with a time delay that holds the brake in the energized condition for a predetermined time after an actuated safety floor switch is deactuated. Thereafter, the brakes are released for carriage movement and subsequent actuations. The time delay is designed so that the safety floor switches do not chatter the brake components on the carriages as a person walks along the floor. Actuation of a safety floor switch also energizes an indicator light on the front panel of the stationary unit to indicate the cause of the brake energization.

Further in accordance with the present invention, the electric circuit includes provisions for controlling the mobile storage system through a safety sweep on each carriage. Actuation of any of the safety sweeps activates the circuit to energize the brakes on all the carriages. The safety sweep circuit includes two timing devices. The first timing device holds the brake in the energized condition for a predetermined period, such as three seconds, after sweep switch actuation. The second timing device is employed to sense continued actuation of a sweep switch. If the switch has not been deactuated after a predetermined time has elapsed, an audio alarm in the circuit is energized to alert nearby personnel of the situation. The safety sweep circuit includes a lamp in the stationary unit panel that lights when any safety sweep switch is actuated. In addition, a slave control box on each carriage is equipped with a lamp that is energized when the safety sweep of that carriage is actuated. Thus, maintenance personnel are quickly directed to the source of the problem.

For additional safety, both the safety sweep and safety floor circuits are designed such that the failure of a switch activates the circuitry with the same results as mechanical actuation of a respective switch. To provide maximum versatility, the present invention is designed to include either the safety sweep or the safety floor or both, depending on the needs of the user of the mobile storage system.

Other objects and advantages of the invention will become apparent to those skilled in the art from the disclosure.

BRIEF DESCRIPTION OF THE DRAWINGS

FIG. 1 is a simplified side view of a typical mobile storage system that advantageously includes the present invention;

FIG. 2 is a view, partially in section, taken along lines 2—2 of FIG. 1;

FIG. 3 is a view, partially in section, taken along lines 3—3 of FIG. 2;

FIG. 4 is a sectional view taken along lines 4—4 of FIG. 1;

FIG. 5 is a simplified sectional view taken along lines 5—5 of FIG. 1, showing a portion of a safety floor;

FIG. 6 is a schematic diagram of a common portion of the electric circuit of the present invention;

FIG. 7 is a schematic diagram of the portion of the electric circuit of the present invention pertaining to the safety floor;

FIG. 8 is a schematic diagram of the portion of the electric circuit of the present invention pertaining to the safety sweeps;

FIG. 9 is a schematic diagram of the portion of the electric circuit of the present invention pertaining to the safety brakes;

FIG. 10 is a schematic diagram of the portion of the electric circuit of the present invention pertaining to the safety sweep switches; and FIG. 11 is a schematic diagram of the portion of the electric circuit of the present invention pertaining to the safety floor switches.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Mobile Storage System

Referring to FIG. 1, a typical mobile storage system 1 is illustrated that includes the present invention. The mobile storage system is particularly useful for storing books and supplies in offices and libraries, but it will be understood that the invention is not limited to mobile storage applications.

The typical mobile storage system 1 includes various combinations of one or more stationary units 3 and one or more substantially identical movable carriages 5. The carriages 5 may be powered by manual or electrical means, not shown, to roll on wheels 7 along parallel rails 9 embedded in the building floor 11. By moving the carriages along the rails 9, aisles 13 are opened and closed between adjacent carriages and stationary units 3.

Safety Brake

To provide for the safety of persons standing in the aisles 13, it is known to equip the carriages 5 with safety means that are designed to stop a moving carriage upon command of a person who is not operating the carriage. Referring to FIGS. 2-4, an exemplary safety system is partially disclosed, with full disclosure occurring in U.S. Pat. No. 4,616,888. The safety system includes a safety brake 19 mounted on an extension 21 of one of the axles 14 that support the carriage wheels 7. The safety brake 19 includes a carrier 23 keyed to the shaft extension 21 for rotation therewith by a key 25. The carrier is retained on the shaft extension by a thrust washer 27 interposed between the carrier and a horizontal bar 29 mounted to the frame 17 of the carriage 5 in any suitable manner. The bar 29 may be partially supported by the end of the shaft extension and held axially in place by a thrust washer 30 and cotter pin 32. With that design, a bearing 34 is employed between the bar and shaft extension.

A sleeve 31 is slipped over the hub portion 33 of the carrier 23, and over the sleeve 31 is placed a cylindrical plate 35 with a friction disc 37 on both sides thereof. To apply a variable amount of axial force to the friction discs 37 and plate 35, a Bellville washer 39 is employed with a nut 41 that is threaded onto the carrier hub 33. Turning the nut 41 on the hub varies the deflection of the Bellville washer 39 and thereby adjusts the axial force on the friction discs and plate. With sufficient axial force, the plate, friction discs, and Bellville washer rotate as a unit with the carrier and nut.

The periphery of the plate 35 is formed with a plurality of notches 43. For the purpose of preventing the plate from rotating with the carrier 23 and axle 14, the safety brake 19 includes an operating mechanism 45 for engaging the plate notches 43. In the structure illustrated in FIG. 3, the operating mechanism 45 comprises a lever 47 that pivots about a pin 49 inserted in the carriage bar 29. The lever 47 may pass through a straight sided opening 51 in the bar so that the lever is guided on the bottom and top surfaces by bar bottom wall 53 and a similar top wall, not illustrated in FIG. 3. To engage the notches 43 of the plate 35, one end of the lever is fabricated with a single tooth 55 that is configured to match the plate notches. The lever is pivoted for selectively engaging and disengaging the tooth 55 with the plate notches by an electric solenoid 57 having a plunger 59 pinned to one end of a rod 61 with a pin 63. The second end of the rod 61 is pinned with a pin 65 to the second end 67 of the lever, which may be made as a clevis for straddling the pin 61. The lever is biased to the disengaged mode relative to the plate by a spring 69. To limit the lever rotation under the influence of the spring 69, a stop 71 may be attached to the bar 29. It will be understood that a safety brake 19 and solenoid 57 are included in each carriage 5.

Safety Switches

In accordance with the present invention, the solenoids 57 in all the carriages 5 are energized to operate the respective brakes 19 by actuation of any one of several safety switches located in either or both a safety sweep and a safety floor. Referring to FIGS. 1 and 4, the safety sweep 72 includes one or more normally closed safety sweep switches 73 in combination with spring loaded safety bars 75. A safety bar 75 is mounted horizontally at a convenient height along the length of each side of each carriage and also on each stationary unit 3. The ends of the safety bars are supported by slotted brackets 77. The safety bars are biased away from the carriage frames 17 by a spring 79 in each bracket 77. FIG. 4 shows the normal mode, wherein the safety sweep switch 73 is not actuated by the safety bar.

Referring to FIG. 5, the safety floor 78 is represented in simplified form. Reference numeral 79 indicates a flexible floor such as is disclosed in U.S. Pat. No. 3,640,595. One of several normally closed safety floor switches 81 is illustrated mounted on a solid support 83 in a position to sense downward movement of the floor 79 by a person or object on the floor. Actuating any safety sweep switch 73 or any safety floor switch 81 activates a novel electrical circuit for energizing all the solenoids 57 to operate the brakes 19 and stop all moving carriages 5.

Circuit Apparatus

Referring to FIGS. 6-11, the circuit of the present invention will be explained in detail. In FIG. 6, reference numeral 84 indicates a portion of the circuit into which 120 volt AC line power is brought via terminals L1 and L2. The circuit portion 84 is located in a master control box 85. As shown in FIG. 1, the master control box 85 is preferably placed on a stationary unit 3. In FIG. 6, reference characters T1 indicate a transformer for reducing the line voltage to a lesser voltage, such as 24 volts, at the junctions 87.

Junctions 87 of the circuit portion 84 correspond with junctions 87' of circuit portion 89, FIG. 7, and junctions 87'' of circuit portion 91, FIG. 8. Circuit portion 89 pertains to the safety floor 78, FIG. 5. Circuit portion 89 is housed in the master control box 85. Circuit portion 91 pertains to the safety sweep 72, FIG. 4, and is also housed within the master control box.

In circuit portion 84, FIG. 6, terminals MB in branch 86 are connected with terminals MB' of a circuit portion 93 shown in FIG. 6. The circuit 93 pertains to the brake solenoids 57, FIG. 3. There is a circuit 93 for each carriage 5. Electrical power is brought from the master control box 85 in the stationary unit 3 to the various carriages by means of conventional pantographs, not shown, as is known in the art.

Each circuit 93 consists of two parts. The first partial circuit 94 is located within a slave control box 96 mounted on each carriage 5. Preferably, the slave control boxes 96 are located on top of the carriage shelves. See FIG. 1. Connections between the terminals MB (FIG. 6) in the master control box 85 and the terminals MB' in the slave control boxes are through conventional connectors 98. The wires connecting the connectors 98 of the slave and master boxes may be suspended above the carriages 5 by overhead trolleys, power tracks, or similar known means. In circuit portion 94, FIG. 9, T2 represents a 24 volt step down transformer. The second part 100 of each circuit portion 93 includes the solenoid 57 that engages the safety brake 19, FIG. 3. The solenoid, which is located in close proximity to the safety brake, is connected to the circuit part 94 in the slave control box by known plugs and sockets 102.

In circuit portion 89, FIG. 7, reference numeral 92 indicates a branch circuit that contains an override device 95 and a relay coil CR5. Although circuit branch 92 is shown as a part of the safety floor circuit 89, that circuit branch is common to both the safety floor circuit 89 and the safety sweep circuit 91. The override 95 is useful for moving the carriages 5 in the event a switch failure prevents moving the carriages in the normal manner. The physical location of the override is preferably in an enclosure 97 that is mounted to the front panel 99 of the mobile storage system stationary unit that contains the master control box 85. See FIG. 1. Connections from the circuit portion 89 in the master control box to the override in enclosure 97 is by means of conventional plugs and sockets 101. Preferably, the override is operated by a key, not shown. The key lock override is shown in the override mode in FIG. 7.

In circuit portion 89, reference numeral 103 is an indicator circuit that is activated when a safety floor switch 81 (FIG. 5) is actuated. Indicator circuit 103 includes a diode D31, resistor R11, and light emitting diode D1. Activation of the circuit 103 is indicated by the illumination of the light emitting diode D1. The physical location of the circuit 103 is in the enclosure 97 on the panel 99, FIG. 1. Connection between the circuit portion 89 (FIG. 7) in the master control box 85 and the indicator circuit 103 in the enclosure 97 is by means of standard sparable male and female connectors 105, such as Jacks, FIG. 7.

Reference characters SF in branch 106 of circuit portion 89 are terminals for connecting the terminals SF' of a safety floor circuit 107, FIG. 11. As illustrated in FIG. 11, the safety floor circuit 107 contains the normally closed safety limit switches 81 of the safety floor 78, FIG. 5. Conventional connectors 108 are used to connect the terminals SF and SF'. All the safety floor switches 81 are in a series loop.

Referring to FIG. 8, the safety sweep portion 91 includes a circuit branch 110 containing terminals SS that correspond with terminals SS' of a sweep circuit 109, FIG. 10. There is a sweep circuit 109 for each safety sweep mechanism 72, FIG. 4. Each circuit 109 contains in a series loop the normally closed safety switches 73 associated with a safety sweep 72. The circuits 109 of all the carriages are in series, so that actuating a safety sweep on any carriage will cause the circuit portion 91 to be activated and the brakes of all the carriages to operate. An indicator circuit 111 is in parallel with the safety switches 73 of each carriage. The indicator circuits 111 are located within the respective carriage slave control boxes 96. Each indicator circuit 111 includes a light emitting diode D3 that is viewable through an opening in the slave control box, FIG. 1. The light emitting diode D3 of a circuit 109 is activated to illuminate when a safety sweep switch 73 on the associated carriage is actuated open. Connection between the terminals SS of circuit portion 91 and the terminals SS' of each carriage is by conventional connectors 113.

Circuit portion 91 includes a second indicator circuit 115 that is activated when any safety sweep switch 73 is actuated open. The circuit 115 is located in panel enclosure 97, FIG. 1. Connection between the master control box 85 and the enclosure 97 is through conventional separable male and female connectors 117 such as Jacks. The circuit 115 includes a light emitting diode D2 that is viewable through an opening in the enclosure 97.

Also enclosed in enclosure 97 is a piezo electric alarm B1, which is included in a circuit branch 125 of the circuit portion 91. Connection between the master control box 85 and the enclosure 97 for the alarm B1 is through conventional connectors 119, FIG. 8. The circuit branch 125 also includes a zener diode D5.

Operation

Operation of the safety floor and safety sweep circuits of the present invention is as follows.

It will be assumed that at least one carriage 5 is moving along the rails 9, FIG. 1. In that situation, all safety sweep switches 73 (FIG. 4) and safety floor switches 81 (FIG. 5) are closed. Contact TR1A in branch 123 of circuit portion 89 is open. Relay CR5 is closed through the override 95, which, it will be recalled, is shown in the override mode. Thus, contact CR5A is closed.

When a person steps on the safety floor 78, his weight on the floor 79 actuates one of the safety floor switches 81 to open the safety floor circuit 107, FIG. 11. Relay CR1 thus drops out, closing the contacts CR1A and CR1B. Closed contact CR1A energizes relay TR1, which closes contact TR1A. Relay CR2 is picked up through closed contact CR1B and timer contact TR1A. Picking up relay CR2 closes contacts CR2A and CR2B.

As a result of the foregoing, the solenoids 57 are energized, FIG. 9, to cooperate with the safety brakes 19 for stopping the moving carriage 5 and for locking the brakes on all the other carriages. At the same time, voltage is applied to the circuit branch 103 through both contacts CR1B and CR2A. Consequently, the light emitting diode D1 is illuminated in panel enclosure 97 to indicate that a safety floor switch has been actuated. As long as a safety floor switch is actuated open, the solenoids 57 remain energized to operate the safety brakes and hold the carriages in place. As soon as the actuated safety floor switch is returned to the closed condition, relay CR1 is picked up to open contacts CR1A and CR1B, and the circuit portions 84 and 89 are ready for the next safety floor switch actuation.

It is a feature of the present invention that the solenoids 57 remain energized for a predetermined time after deactuation of an actuated safety floor switch 81. That is the case even if the actuated switch is returned to the deactuated closed condition immediately after actuation. Opening contact CR1A after all safety floor switches have been deactuated to the closed condition starts the timer delay relay TDR1, so that timer contact TR1A do not open immediately. Thus, relay CR2 remains picked up through conracrs CR2A and TR1A, and the solenoids and brakes 19 remain energized after the safety switch has closed as long as the timer contact TR1A is closed. The preferred setting for timer delay relay TDR1 is approximately 3 seconds. Accordingly, after that time has elapsed subsequent to returning an actuated safety floor switch to the closed condition, contact TR1A opens. Then relay CR2 drops out, which opens contacts CR2A and CR2B. Opening contact CR2B deenergizes solenoids 57, thus releasing the brakes. The practical application of this novel circuitry is that the solenoids and brakes do not chatter between the energized and deenergized modes caused by the safety floor switches being momentarily opened and then closed again by a person walking across the safety floor 78. The light emitting diode D1 is deenergized when relay CR2 drops out.

Turning now to the circuit portion 91 pertaining to the safety sweep, it will recalled that circuit branch 92 shown as a part of the safety floor circuit 89 is common with the safety sweep circuit 91. Again, it will be assumed that a carriage 5 is moving and that it is desired to stop the carriage by means of a safety sweep switch 73, FIG. 4. With the carriage moving and the safety sweep switch unactuated, relay CR3 is picked up and contact CR3A in circuit portion 84, FIG. 6, is open. Contacts CR3B and CR3C in circuit portion 91 (FIG. 8) are closed. Timer relays TR2 and TR3 are picked up, so that contact TR2A (FIG. 6) is closed, and contact TR3A is open. The impedance of indicator circuit 111 (FIG. 10) is much higher than that of the switches 73, so the indicator circuit 111, for practical purposes, is unactivated. The same is true for indicator circuit 115 in parallel with all the safety sweep switches (FIG. 8). When a safety sweep switch is actuated to the open condition, full voltage is applied across the indicator circuit 111, and light emitting diode D3 illuminates in the corresponding slave control box 96 (FIG. 1). Relay CR3 drops out, thus opening contacts CR3B and CR3C and closing contact CR3A. Opening contact CR3C drop out relay TR2 and starts timer delay relay TDR2, but the contact TR2A remains closed initially. Consequently, with contacts TR2A and CR3A closed, the solenoids 57 in circuits 94 (FIG. 9) become energized to engage the brakes 19 and stop the moving carriage. Simultaneously, the open contact CR3B drop out relay TR3 and starts timer delay relay TDR3, but the contact TR3A remains open for a predetermined time. With the open circuit branch 110, full voltage is applied across indicator circuit 115, so that light emitting diode D2 illuminates in the panel enclosure 97. The diode D41 blocks half of the AC energy cycle of the current in circuit 115, so that the voltage in circuit 115 does not pick up relay CR3. Thus, when a safety sweep switch is actuated, light emitting diode D2 illuminates in the front panel enclosure 97, and light emitting diode D3 illuminates in the slave control box 96 on the carriage having the actuated safety switch.

If the actuated safety sweep switch 73 is closed immediately after being opened, relay CR3 is picked up to open contact CR3A. The circuits to the solenoids 57 are opened, so that the solenoids become deenergized to release the brakes 19 and permit the carriages 5 to move again. When the circuit branch 109 is closed, the indicator circuit 111 is effectively deactivated, and the light emitting diode D3 ceases to glow. The same is true for indicator circuit 115, i.e., light emitting diode D2 is effectively extinguished. In addition, relay CR3 is again picked up, and the entire circuit is ready for the next actuation of a safety sweep switch.

As long as the branch 110 in circuit portion 91 is open, relay CR3 is dropped out and contact CR3A is closed. However, contact CR3C remains open to continue the timing function of the timer relay TDR2 before contact TR2A opens. Ultimately, the time set into timer TDR2 is reached, and the contact TR2A opens. At that point, the solenoids 57 are deenergized and the carriages 5 may be moved even though a safety sweep switch 73 remains actuated open. Preferably, the time set into timer relay TR2 is approximately 3 seconds. The light emitting diodes D2 and D3 continue to be illuminated as long as the circuit branch 110 is open.

In the preferred embodiment of the present invention, the safety sweep circuit portion 91 is designed to sense the continued open condition of the actuated safety sweep switch 73. In that case, contact CR3B, which opened at initial actuation of the safety sweep switch, remains open, as do contacts CR4A and CR4B, due to open contact TR3A. Contact CR3C also remains open, thereby preventing contact TR2A from energizing the solenoids 57. After a predetermined delay, which preferably is about 15 minutes, contact TR3A closes, and relay CR4 is picked up. Contact CR4B then closes to pick up timer relay TR3 and open contact TR3A. At the same time, contact CR4B closes to close the circuit branch 125 to the piezo electric alarm B1. Thus, after a 15 minute delay, the alarm B1 sounds to alert nearby personnel that the braking system is inoperative and will not stop a moving carriage because the solenoids will not be energized even if a safety sweep switch is actuated.

It will be understood that a failure of any safety sweep switch 73 or safety floor switch 81 has the same effect on the carriages 5 as the actuation of a respective switch to the open condition. Thus, a loose wire or other mechanical failure within a safety floor switch will prevent motion of all carriages until the fault is corrected. Failure of a safety sweep switch temporarily prevents carriage movement and ultimately sounds a warning. In both cases, the respective indicator lights illuminate, as with a switch actuation.

To provide access to a failed safety floor switch 81, the key override 95 is employed. Referring to FIGS. 6, 7, and 9, actuating the key override opens the branch circuit 92 to drop out relay CR5 and thus open contact CR5A to override the closed contact CR2B. Consequently, the circuit 94 is opened to deenergize the solenoids 57 and brake 19, thereby permitting carriage movement.

Further in accordance with the present invention, the mobile storage system 1 may employ either the safety sweep system or the safety floor system or both. As previously explained, circuit portion 84 and branch 92 are common to both the safety sweep circuit portion 89 and the safety floor circuit portion 91. If the safety floor circuit is not desired, the remainder of the circuit portion 89, other than branch 92, is eliminated, along with the partial circuit 107 of FIG. 11. In addition, the contacts CR2B and associated wiring 112 of circuit portion 84 are eliminated. On the other hand, if only the safety floor system is desired, the circuit portion 91 pertaining to the safety sweep circuit is eliminated, together with contacts TR2A and CR3A of circuit portion 84 and partial circuit 109 of FIG. 10. Of course, the circuit portion 94 is used in all cases.

Thus, it is apparent that there has been provided, in accordance with the invention, a safety floor and sweep operating from line power that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. An electric circuit for controlling at least one solenoid between energized and deenergized conditions and comprising:
   a. a first circuit portion connected to a source of electric power and having at least one branch that includes the solenoid to be controlled; and
   b. a second circuit portion electrically connected to the first circuit portion comprising:
      i. a first branch containing at least one safety switch for being actuated to an open condition and deactuated to a closed condition;
      ii. relay and contact means in the first and second circuit portions for responding to actuation of the safety swtich to energize the solenoid and to deenergize the solenoid after the safety switch is deactuated;
      iii. timer relay and contact means in the first and second circuit portions for retaining the solenoid in the energized condition for a predetermined time after deactuation of the safety switch; and
      iv. indicator means controlled by the relay and contact means for visually indicating the energization of the solenoid,
   so that the solenoids remain energized after deactuation of the safety switch until the predetermined time on the timer means has elapsed.

2. An electric circuit for controlling at least one solenoid between energized and deenergized conditions and comprising:
   a. a first circuit portion connected to a source of AC electric power and having at least one branch that includes the solenoid to be controlled; and
   b. a second circuit portion electrically connected to the AC first circuit portion comprising:
      i. a first branch containing at least one safety switch for being actuated to an open condition and deactuated to a closed condition;
      ii. relay and contact means in the first and second circuit portions for responding to actuation of the safety switch to energize the solenoid and to deenergize the solenoid after the safety switch is deactuated;
      iii. timer relay and contact means in the first and second circuit portion for retaining the solenoid in the energized condition for a predetermined time after deactuation of the safety switch; and
      iv. indicator means controlled by the relay and contact means for visually indicating the energization of the solenoid, the indicator means including an indicator circuit in parallel with the first branch of the second circuit portion containing the safety switch, the indicator circuit including a light emitting diode for illuminating when the solenoid is energized and means for blocking a portion of the AC voltage cycle in the indicator circuit,
   so that the solenoids remain evergized after deactuation of the safety switch until the predetermined time on the timer means has elapsed.

3. An electric circuit for controlling at least one solenoid between energized and deenergized conditions comprising:
   a. a first circuit portion connected to a source of electric power and having at least one first branch that includes the solenoid to be controlled; and
   b. a second circuit portion electrically connected to the first circuit portion and comprising:
      i. a first branch containing at least one safety switch for being actuated to an open condition and deactuated to a closed condition;
      ii. a first relay in the second circuit portion for sensing safety switch actuation;
      iii. first contact means in the first and second circuit portions for responding to the first relay to energize the solenoid when the safety switch is actuated and to deenerize the solenoid when the safety switch is deactuated;
      iv. first timer means controlled by the first contact for deenergizing the solenoid at a first predetermined time after actuation of the safety switch; and
      v. indicator means for visually indicating the energization of the solenoid,
   so that the solenoid is deenergized after a predetermined time even if the safety switch remains actuated open.

4. An electric circuit for controlling at least one solenoid between energized and deenergized conditions comprising:
   a. a first circuit portion connected to a source of electric power and having at least one first branch that includes the solenoid to bo controlled; and
   b. a second circuit portion electrically connected to the first circuit portion and comprising:
      i. a first branch containing a plurality of safety switches for being actuated to open conditions and deactuated to closed conditions, the safety switches being arranged into a plurality of groups with at least one safety switch in each group, the safety switches within each group being electrically connected in a series loop, the groups of safety switches being electrically connected in series;
      ii. a first relay in the second circuit portion for sensing safety switch actuation;
      iii. first contact means in the first and second circuit portions for responding to the first relay to energize the solenoid when a safety switch is actuated and to deenergize the solenoid when a safety switch is deactuated;
      iv. first timer means controlled by the first contact for deenergizing the solenoid at a first predetermined time after actuation of a safety switch; and
      v. indicator means for visually indicating the energization of the solenoid, the indicator means comprising a first indicator circuit in parallel with each group of safety switches, each first indicator circuit having means for blocking a portion of the AC power cycle in the first indicator circuit and means for illuminating when a safety switch in the respective group is actuated, and a second indicator circuit in parallel with all the groups of safety switches the second indicator circuit having means for blocking a portion of the AC power cycle in the second indicator circuit and means for illuminating when any of the safety switches is actuated, so that the solenoid is deenergized after a predetermined time even if the safety switch remains actuated open.

5. An electric circuit for controlling at least one solenoid between energized and deenergized conditions comprising:
   a. a first circuit portion connected to a source of electric power and having at least one first brance that includes the solenoid to be controlled; and
   b. a second circuit portion electrically connected to the first circuit portion and comprising:
      i. a first branch containing at least one safety switch for being actuated to an open condition and deactuated to a closed condition;
      ii. a first relay in the second circuit portion for sensing safety switch actuation;
      iii. first contact means in the first and second circuit portions for responding to the first relay to energize the solenoid when the safety switch is actuated and to deenergize the solenoid when the safety switch is deactivated;
      iv. first time means controlled by the first contact for deenergizing the solenoid at a first predetermined time after actuation of the safety switch;
      v. indicator means for visually indicating the energization of the solenoid;
      vi. a second branch circuit containing an audio alarm;
      vii. a second timer controlled by the first relay and first contact means, the second timer being activated by the first relay and first contact means when a safety switch is actuated and deactivated when the safety switch is deactivated; and
      viii. second relay and contact means controlled by the second timer for energizing the audio alarm in response to a signal from the second timer at a predetermined time after a safety switch is actuated and before the safety switch is deactivated, so that an alarm sounds if the actuated safety switch is not deactuated within a predetermined time after actuation.

6. In combination with a mobile storage system having at least one stationary unit and at least one movable carriage; a safety brake on the carriage; and a solenoid on the carriage for operating the safety brake, apparatus for controlling the solenoid between energized and deenergized conditions comprising:
   a. safety floor means located adjacent the mobile storage system and having at least one safety floor switch for being actuated by a person standing on the safety floor;
   b. a first electric circuit portion connected to a source of electric power;
   c. a first circuit branch connected to the first circuit portion and containing the solenoid to be controlled; and
   d. a second circuit portion electrically connected to the first circuit portion comprising:
      i. a second circuit branch containing at least one safety floor switch for being actuated to an open condition and deactuated to a closed condition;
      ii. relay and contact means in the first and second circuit portions for responding to actuation of the safety floor switch to energize the solenoid and to deenergize the solenoid after the safety floor switch is deactuated;
      iii. timer relay and contact means in the second circuit portion for retaining the solenoid in the energized condition for a predetermined time after deactuation of the safety switch; and
      iv. indicator means controlled by the relay and contact means for visually indicating the energization of a solenoid.

7. In combination with a mobile storage system having at least one stationary unit and at least one movable carriage; a safety brake on the carriage; and a solenoid on the carriage for operating the safety brake, apparatus for controlling the solenoid between energized and deenergized conditions comprising:
   a. safety floor means located adjacent the mobile storage system and having at least one safety floor switch for being actuated by a person standing on the safety floor;
   b. a first electric circuit portion connected to a source of AC electric power;
   c. a first circuit branch connected to the first circuit portion and containing the solenoid to be controlled; and
   d. a second circuit portion electrically connected to the first AC circuit portion comprising;
      i. a second circuit branch containing the electrical terminals of the safety floor switch;
      ii. relay and contact means in the first and second circuit portions for responding to actuation of the safety floor switch to energize the solenoid and to deenergize the solenoid after the safety floor switch is deactuated;
      iii. timer means in the second circuit portion for retaining the solenoid in the energized condition for a predetermined time after deactuation of the safety switch; and
      iv. indicator means controlled by the relay and contact means for visually indicating the energization of a solenoid, the indicator means including an indicator circuit in parallel with the first circuit branch containing the safety switch, the indicator circuit including a light emitting diode for illuminating when a solenoid is energized and means for blocking a portion of the AC voltage cycle in the indicator circuit.

8. The combination of claim 7 wherein the timer means retains the solenoid in the energized condition for approximately 3 seconds after the safety floor switch is deactuated to thereby prevent the solenoid from chattering as a person walks across the safety floor.

9. The combination of claim 7 further comprising:
   a. a master control box mounted to the stationary unit, the first and second circuit portions being located within the master control box; and
   b. a panel enclosure mounted to the stationary unit, the indicator circuit being located in the enclosure, the enclosure having an opening therein to permit viewing of the light emitting diode to determine whether the solenoid is energized.

10. In combination with a mobile storage system having at least one stationary unit and at least one movable carriage; a safety brake on the carriage; and a solenoid on the carriage for operating the safety brake, apparatus for controlling the solenoid between energized and deenergized conditions comprising:
a. safety sweep means mounted to the carriage and having at least one safety sweep switch for being actuated by a person adjacent the carriage;
b. a first electric circuit portion connected to a source of electric power;
c. a first circuit branch connected to the first circuit portion and containing the solenoid to be controlled; and
d. a second circuit portion electrically connected to the first circuit portion and comprising:
 i. a first circuit branch containing the electric terminals of the safety sweep switch;
 ii. a first relay in the second circuit portion for sensing safety sweep switch actuation;
 iii. first contact means in the first and second circuit portions for responding to the first relay to energize the solenoid when the safety sweep switch is actuated and to deenergize the solenoid when the safety sweep switch is deactuated;
 iv. first timer means controlled by the first contact means to deenergize the solenoid at a predetermined time after actuation of the safety sweep switch; and
 v. indicator means for visually indicating the energization of the solenoid.

11. In combination with a mobile storage system having at least one stationary unit and at least one movable carriage; a safety brake on the carriage; and a solenoid on the carriage for operating the safety brake, apparatus for controlling the solenoid between energized and deenergized conditions comprising:
a. safety sweep means mounted to the carriage and having at least one safety sweep switch for being actuated by a person adjacent the carriage;
b. a first electric circuit portion connected to a source of electric power;
c. a first circuit branch connected to the first circuit portion and containing the solenoid to be controlled; and
d. a second circuit portion electrically connected to the first circuit portion and comprising:
 i. a first circuit branch containing the electric terminals of the safety sweep switch;
 ii. a first relay in the second circuit portion for sensing safety sweep switch actuation;
 iii. first contact means in the first and second circuit portions for responding to the first relay to energize the solenoid when the safety sweep switch is actuated and to deenergize the solenoid when the safety sweep switch is deactuated;
 iv. first timer means controlled by the first contact means to deenergize the solenoid at a predetermined time after actuation of the safety sweep switch; and
 v. indicator means for visually indicating the energization of the solenoid, wherein the indicator means comprises an indicator circuit in the first branch of the second circuit portion and in parallel with the safety sweep switches, the indicator circuit having means for blocking a portion of the AC power cycle in the indicator circuit and light emitting diode means for illuminating when the solenoid is energized.

12. The combination of claim 11 wherein the second circuit portion further comprises:
a. a second branch circuit containing an audio alarm;
b. a second timer controlled by the first relay and first contact means, the second timer being activated by the first relay and first contact means when a safety sweep switch is actuated and deactivated when the safety sweep switch is deactuated; and
c. second relay and contact means controlled by the second timer for energizing the audio alarm at a second predetermined time in response to a signal from the second timer after a safety sweep switch is actuated and before the safety sweep switch if deactuated,
so that an alarm sounds if the actuated safety sweep switch is not deactuated within a predetermined time after actuation.

13. The combination of claim 12 further comprising:
a. a master control box mounted to the stationary unit, the first and second circuit portions being located with the master control box;
b. a panel enclosure mounted to the stationary unit, the indicator circuit and audio alarm being located in the enclosure, the enclosure having an opening therein to permit viewing of the light emitting diode means.

14. The combination of claim 13 wherein:
a. there is a plurality of movable carriages, each carriage having a safety sweep means, the safety sweep switches of the safety sweep means being electrically connected in a series loop;
b. the second circuit portion further comprises a second indicator circuit corresponding to each safety sweep means, the second indicator circuits being in parallel with the safety sweep switches of the respective safety switch means of each carriage, each second indicator circuit having means for blocking a portion of the AC power cycle within the second indicator circuit and a light emitting diode for illuminating when the respective safety sweep switch is actuated; and
c. a slave control box mounted to each carriage, each second indicator circuit being located in the respective slave control box, each slave control box having an opening therein for viewing the light emitting diode of the second indicator circuit,
so that the carriage having the actuated safety sweep switch is readily determined by viewing the illuminated light emitting diode in the slave control box.

15. In combination with a mobile storage system having at least one stationary unit; a plurality of movable carriages; a safety brake on each carriage; and an electric solenoid on each carriage for operating the respective safety brake, apparatus for controlling the solenoids to energize and deenergize the safety brakes comprising:
a. safety floor means located adjacent the mobile storage system and having at least one safety floor switch for being actuated by a person standing on the safety floor;
b. safety sweep means mounted to each carriage, each safety sweep means having at least one safety sweep switch, the safety sweep switches being electrically connected in a series loop;
c. a first electric circuit portion connected to a source of line electric power;
d. a first circuit branch connected to the first circuit portion and containing the solenoids to be energized;
e. a second circuit portion electrically connected to the first circuit portion and comprising:

i. a first branch containing the safety floor switches;
ii. relay and contact means in the first and second circuit portions for responding to actuation of a safety floor switch to energize the solenoids and to deenergize the solenoids after the safety sweep switch is deactuated;
iii. timer relay and contact means in the first and second circuit portions for retaining the solenoids in the energized condition for a predetermined time after deactuation of the safety floor switch;
iv. indicator means controlled by the relay and contact means for visually indicating the energization of the solenoids; and
f. a third circuit portion connected to the first circuit portion comprising:
 i. a first branch containing the safety sweep switches;
 ii. a second relay in the third circuit portion for sensing safety sweep switch actuation;
 iii. second contact means in the first and third circuit portions for responding to the second relay to energize the solenoids when a safety sweep switch is actuated;
 iv. second timer means controlled by the second relay and second contact means to deenergize the solenoids at a first predetermined time after actuation of a safety sweep switch; and
 v. second indicator means for visually indicating the energization of the solenoids.

16. In combination with a mobile storage system having at least one stationary unit; a plurality of movable carriages; a safety brake on each carriage; and an electric solenoid on each carriage for operating the respective safety brake, apparatus for controlling the solenoids to energize and deenergize the safety brakes comprising:
a. safety floor means located adjacent the mobile storage system and having at least one safety floor switch for being actuated by a person standing on the safety floor;
b. safety sweep means mounted to each carriage, each safety sweep means having at least one safety sweep switch, the safety sweep switches being electrically connected in a series loop;
c. a first electric circuit portion connected to a source of AC line electric power;
d. a first circuit branch connected to the first circuit portion and containing the solenoids to be energized;
e. a second circuit portion electrically connected to the first circuit portion and comprising:
 i. a first branch containing the safety floor switches;
 ii. relay and contact means in the first and second circuit portions for responding to actuation of a safety floor switch to energize the solenoids and to deenergize the solenoids after the safety sweep switch is deactuated;
 iii. timer means in the first and second circuit portions for retaining the solenoids in the energized condition for a predetermined time after deactuation of the safety floor switch;
 iv. indicator means controlled by the relay and contact means for visually indicating the energization of the solenoids, the indicator means of the second circuit portion including an indicator circuit in parallel with the first branch of the second circuit portion containing the safety floor switches and including a light emitting diode for illuminating when a solenoid is energized and means for blocking a portion of the AC voltage cycle in the indicator circuit; and
f. a third AC circuit portion connected to the first circuit portion comprising:
 i. a first branch containing the safety sweep switches;
 ii. a second relay in the third circuit portion for sensing safety sweep switch actuation;
 iii. second contact means in the first and third circuit portions for responding to the second relay to energize the solenoids when a safety sweep switch is actuated;
 iv. second timer means controlled by the second relay and second contact means to deenergize the solenoids at a first predetermined time after actuation of a safety sweep switch;
 v. second indicator means for visually indicating the energization of the solenoids, the indicator means of the third circuit portion comprising a plurality of second indicator circuits, a second indicator circuit being in parallel with the safety sweep switches of each safety sweep means, each second indicator circuit having means for blocking a portion of the AC power cycle in the indicator circuit and a light emitting diode for illuminating when a respective safety sweep switch is actuated, and a third indicator circuit in parallel with all the safety sweep switches in the series loop, the third indicator circuit having means for blocking a portion of the AC cycle in the indicator circuit and a light emitting diode for illuminating when any safety sweep switch is actuated,
so that the light emitting diode of the first indicator circuit illuminates when a safety floor switch is actuated and the light emitting diodes of the second and third indicator circuits illuminate when a safety sweep switch is actuated.

17. The combination of claim 16 wherein the third circuit portion further comprises:
a. a second branch circuit containing an audio alarm;
b. a third timer controlled by the second relay and contact means being actuated thereby when a safety sweep switch is actuated and deactivated when the safety sweep switch is deactuated; and
c. third relay and contact means controlled by the third timer for energizing the audio alarm at a predetermined time in response to a signal from the third timer after a safety sweep switch is actuated and before the safety sweep switch is deactuated,
so that the alarm sounds if the actuated safety sweep switch is not deactuated within a second predetermined time after actuation.

18. The combination of claim 17 further comprising:
a. a master control box mounted on the stationary unit, the first, second, and third circuit portions beings located within the master control box;
b. a panel enclosure mounted on the stationary unit, the first indicator circuit of the second circuit portion and the third indicator circuit of the third circuit portion and the audio alarm of the third circuit portion being located in the panel enclosure, the enclosure having a pair of openings therein for viewing the light emitting diodes of the first and third indicator circuits; and
c. a slave control box mounted to each movable carriage, a second indicator circuit of the third circuit portion being located in the respective slave control boxes, each slave control box having an opening therein for viewing the light emitting diode of the second indicator circuit.

* * * * *